United States Patent
Kalenderidis et al.

(10) Patent No.: US 11,205,021 B2
(45) Date of Patent: Dec. 21, 2021

(54) SECURING ACCESSORY INTERFACE (71) Applicant: Apple Inc., Cupertino, CA (US)

(72) Inventors: Loukas Kalenderidis, San Francisco, CA (US); Ivan Krstic, San Francisco, CA (US); Brian J. Dawbin, Santa Clara, CA (US); Filip Stoklas, Prague (CZ); Carmen A. Bovalino, III, San Francisco, CA (US); Shyam S. Toprani, San Francisco, CA (US); Christopher B. Zimmermann, San Jose, CA (US); Libor Sykora, Hostivar (CZ); Arnold S. Liu, Mountain View, CA (US); Lucia E. Ballard, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 292 days.

(21) Appl. No.: 16/403,259

(22) Filed: May 3, 2019

(65) Prior Publication Data
US 2020/0233984 A1 Jul. 23, 2020

Related U.S. Application Data (60) Provisional application No. 62/794,985, filed on Jan. 21, 2019.

(51) Int. Cl.
*G06F 21/85* (2013.01)
*G06F 1/28* (2006.01)
*G06F 21/32* (2013.01)

(52) U.S. Cl.
CPC ............... *G06F 21/85* (2013.01); *G06F 1/28* (2013.01); *G06F 21/32* (2013.01); *G06F 2221/2149* (2013.01)

(58) Field of Classification Search
CPC ............. G06F 21/85; G06F 21/32; G06F 1/28
See application file for complete search history.

(56) References Cited

U.S. PATENT DOCUMENTS 7,739,732 B2 * 6/2010 Camilli .................. G06F 21/79
726/16
7,877,788 B1 * 1/2011 Topp ....................... G06F 21/85
726/4

(Continued)

OTHER PUBLICATIONS

Apple Inc., Face ID Security, Nov. 2017, 6 pages.
Apple Inc., iOS Security, iOS 11, Jan. 2018, 82 pages.

*Primary Examiner* — Vance M Little
(74) *Attorney, Agent, or Firm* — Kowert, Hood, Munyon, Rankin & Goetzel, P.C.

(57) ABSTRACT

Techniques are disclosed relating to securing an accessory interface on a computing device. In various embodiments, a computing device detects a connection of an accessory device to an accessory interface port and, in response to the detected connection, evaluates a policy defining one or more criteria for restricting unauthorized access to the accessory interface port. Based on the evaluating, the computing device determines whether to disable the accessory interface port to prevent communication with the connected accessory device. In some embodiments, the computing device includes an interconnect coupled between the processor and the accessory interface port, and the interconnect includes a hub circuit configured to facilitate communication between a plurality of devices via the interconnect. In some embodiments, the computing device, in response to determining to disable the accessory interface port, instructs the hub circuit to prevent traffic from being conveyed from the accessory interface port.

19 Claims, 7 Drawing Sheets

(56) References Cited

U.S. PATENT DOCUMENTS

| | | | |
|---|---|---|---|
| 8,775,757 B2 | 7/2014 | Polzin et al. | |
| 8,788,723 B1* | 7/2014 | Hogan | G06F 17/00 710/18 |
| 8,832,465 B2 | 9/2014 | Gulati et al. | |
| 8,873,747 B2 | 10/2014 | Polzin et al. | |
| 9,043,632 B2 | 5/2015 | Machnicki et al. | |
| 9,047,471 B2 | 6/2015 | Polzin et al. | |
| 9,547,778 B1 | 1/2017 | Paaske et al. | |
| 2002/0095501 A1* | 7/2002 | Chiloyan | G06F 9/4415 709/227 |
| 2002/0099764 A1* | 7/2002 | Stern | G06Q 30/0247 709/203 |
| 2006/0010199 A1* | 1/2006 | Brailean | H04L 67/125 709/204 |
| 2006/0036442 A1* | 2/2006 | Novack | H04L 63/0861 704/273 |
| 2006/0037084 A1* | 2/2006 | Brown | G06F 21/85 726/28 |
| 2008/0244108 A1* | 10/2008 | Abramson | G06F 13/4291 710/16 |
| 2010/0031371 A1* | 2/2010 | Adams | H04L 63/083 726/27 |
| 2011/0039581 A1* | 2/2011 | Cai | H04W 48/04 455/456.4 |
| 2011/0252234 A1 | 10/2011 | De Atley et al. | |
| 2012/0079563 A1* | 3/2012 | Green | G06F 21/572 726/3 |
| 2012/0131295 A1* | 5/2012 | Nakajima | G06F 11/1456 711/162 |
| 2014/0327518 A1* | 11/2014 | Loutit | G05B 19/00 340/7.58 |
| 2015/0205630 A1* | 7/2015 | Hu | G06F 3/1423 718/1 |
| 2017/0357830 A1 | 12/2017 | Benson et al. | |
| 2017/0373843 A1 | 12/2017 | Benson et al. | |
| 2019/0080066 A1* | 3/2019 | Van Os | G06K 9/00926 |
| 2019/0354153 A1* | 11/2019 | Hauser | G06F 1/28 |
| 2020/0226298 A1* | 7/2020 | Appleboum | G06F 21/577 |

* cited by examiner

SECURING ACCESSORY INTERFACE

The present application claims priority to U.S. Prov. Appl. No. 62/794,985, filed Jan. 21, 2019, which is incorporated by reference herein in its entirety.

BACKGROUND

Technical Field

This disclosure relates generally to computing devices, and, more specifically, to computing interfaces used to couple accessory devices.

Description of the Related Art

A computing device may include one or more interfaces that allow a user to connect accessory/peripheral devices that interact with the computing device. For example, a user may be able to expand the storage available to a laptop computer by plugging an external hard drive into a Universal Serial Bus™ (USB) interface of the laptop computer and using the external hard drive in addition to any internal storage. As another example, a user may use an accessory port on a mobile phone to plug the phone into a car in order to play music over the car's speakers via the car's stereo system. While interfaces to accessory devices can be important to the user experience, they increase the attack surface of a device as they provide a way for an unauthorized person with physical access to a device to potentially compromise the device.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to perform a biometric authentication" is intended to cover, for example, circuitry in an integrated circuit that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may use a first accessory device and a second accessory device. The term "first" is not limited to the initial accessory device connected to the mobile device. The term "first" may also be used when only one accessory device of the mobile device is used.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes embodiments in which a computing device evaluates one or more criteria to determine whether to enable or disable an accessory interface port used to communicate with accessory devices. As will be described below, in various embodiments, a computing device is configured to detect a connection of an accessory device to an accessory interface port and evaluate a policy for restricting unauthorized access to the accessory interface port. This policy may define various criteria indicative of whether an authorized or unauthorized user has connected the accessory device to the accessory interface port. Examples of various factors that may be assessed when evaluating these criteria may include how much time has elapsed since a previous accessory device was connected, whether a lock screen is being presented to the user, whether the accessory device is known to the computing device based on a previous connection, etc. Based on this evaluation, the computing device may determine whether to place the accessory port into a restricted mode in which the port is disabled (or is severely restricted in its capabilities) or to place the port into a standard/unrestricted mode in which the port is enabled and able to function normally. In many instances, securing the accessory port in the manner described herein can reduce that attack surface created by the port and provide a better user experience than, for example, removing the accessory port entirely or requiring the user explicitly authorize use of the port each time an accessory device is connected to the port.

Figure 1:
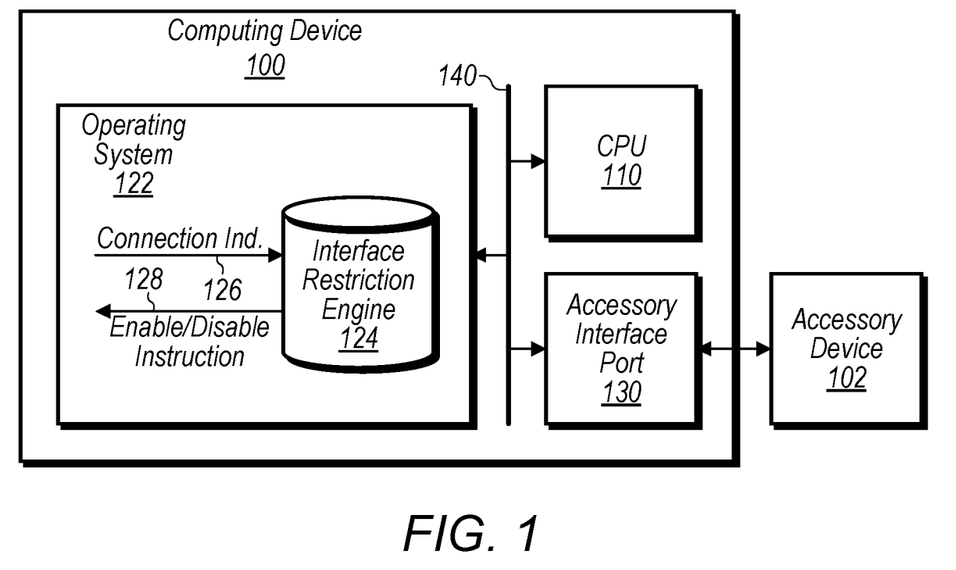
FIG. 1 is a block diagram illustrating an example of a computing device configured to secure access to its accessory interface in order to prevent unauthorized use.

Turning now to FIG. 1, a block diagram of a computing device 100 configured to secure an accessory interface is depicted. In the illustrated embodiment, computing device 100 includes a central processing unit (CPU) 110, a memory 120 having an operating system (OS) 122, and an accessory interface port 130 coupled together via an interconnect 140. As shown, operating system 122 further includes an interface restriction engine 124. In some embodiments, device 100 may be implemented differently than shown. For example, device 100 may include multiple interface ports 130, any of the additional circuitry discussed below with respect to FIGS. 4 and 6, etc.

Accessory interface port 130, in various embodiments, is an interface configured to facilitate communication between an accessory device 102 and components of computing device 100. Accordingly, port 130 may include a physical interface (PHY) circuit configured to transmit and receive signals communicated via port 130 over a wired connection to accessory device 102. The PHY circuit may be configured to encode and decode packets received via port 130 and raise an interrupt to cause an accessory stack of operating system 122 to process the packets. Port 130 may also include a housing configured to receive a cable used to convey signals between accessory device 102 and computing device 100. Accessory interface port 130 may support any suitable protocol such as Universal Serial Bus™ (USB), Thunderbolt™, Ethernet, DisplayPort™, etc. Although various techniques described herein are described with respect to a wired connection to accessory interface port 130, in some embodiments, these techniques may be employed with respect to a wireless interface configured to establish a wireless connection with an accessory device 102 such as one using Zigbee®, Bluetooth®, Wi-Fi™, etc.—thus description of port 130 should be limited to merely wired connections. Accessory device 102 may also correspond to any suitable accessory such as an input device, storage device, a network interface card, a display, an external graphics processing unit (GPU), an audio system, a vehicle navigation system, etc. In some embodiments, accessory device 102 may also be configured to supply power to computing device 100, which may use the supplied power to charge a battery power supply of computing device 100 as will be discussed in greater detail below.

In various embodiments, when accessory device 102 is connected to accessory interface port 130, port 130 is configured to detect the connection and indicate the connection to OS 122. Accordingly, port 130 may detect the connection based on a changing resistance across one or more wires of port 130 and/or the presence of a voltage on one or more wires. In some embodiments, if accessory device 102 is able to supply power, accessory device 102 may be permitted to supply power at a default unnegotiated rate until a determination to enable or disable port 130 can be made. Afterwards, accessory device 102 may negotiate a subsequent higher charge rate if a determination to enable port 130 is made. In various embodiments, accessory interface port 130 notifies OS 122 of the connection by causing an appropriate interrupt to be raised.

OS 122, in various embodiments, is executable by CPU 110 to manage various operations of computing device 100 including the enabling and disabling of accessory interface port 130. In the illustrated embodiment, OS 122 relies on an evaluation performed by interface restriction engine 124 to determine whether accessory interface port 130 is in a restricted or unrestricted mode. Accordingly, as shown in FIG. 1, OS 122 may send an indication of 128 of a detected connection to engine 124 and, based on its evaluation, receive an instruction 128 to enable or disable accessory interface port 130. In response, OS 122 may use one or more suitable techniques to enable or disable port 130. As will be discussed below with respect to FIG. 2, in some embodiments, OS 122 controls access to accessory interface port 130 by enabling or disabling the accessory stack that processes traffic communicated via port 130. In some embodiments, OS 122 may also instruct interconnect 140 to prevent the routing of traffic from port 130. In some embodiments, OS 122 may further advertise a reduced/limited feature set than the feature set available when an instruction 128 to enable port 130 is received. For example, when in a restricted mode, OS 122 may advertise that accessory interface port 130 supports a charging ability, but not advertise that port 130 in an unrestricted mode can also provide audio streaming, phone calling, navigational maps, etc. In various embodiments, in response to receiving an instruction 128 to disable port 130, OS 122 is executable to display a notification to the user, which may instruct the user to perform a user authentication in order to authorize use of accessory interface port 130.

Interface restriction engine 124, in various embodiments, is a set of program instructions executable to evaluate a policy defining one or more criteria for restricting unauthorized access to accessory interface port 130. As will be discussed below in greater detail with respect to FIG. 2, this policy may include multiple rules, each defining a set of one or more criteria to be assessed in determining whether to enable or disable accessory port 130. These criteria may correspond to any suitable criteria indicative that an authorized user (or an unauthorized user) has connected accessory device 102 to the accessory interface port 130 and may be based on any suitable factors. For example, such factors may include how much time has elapsed since a previous accessory device 102 was connected to port 130, whether (and how long) a lock screen is being presented to the user, whether accessory device 102 is known to the computing device based on a previous connection to port 130, whether device 100 is still permitting a user to unlock device 100 via a biometric authentication, whether computing device 100 has been reported as being lost, what underlying transport protocol is being used (e.g., whether port 130 is using USB or Thunderbolt™), etc. In some embodiments, engine 124 may perform an evaluation in response to an accessory device 102 being connected to accessory interface port 130. In another embodiment, an engine 124 may perform an evaluation independently of accessory device 102 being connected such as when factors affecting the evaluation change.

In some embodiments in which computing device 100 includes multiple accessory interface ports 130, engine 124 may evaluate a policy with respect to each port 130 individually. Accordingly, engine 124 may determine that criteria for restricting access for a first accessory port 130 have been satisfied and restrict access to it while continuing to allow access to a second accessory port 130 as long as criteria for restricting access to the second accessory port 130 have not yet been satisfied. For example, the first accessory port 130 may be in a period of disuse while the second accessory port 130 still has a connected accessory device 102. Still further, in some embodiments, a given accessory device 102 may be connected that has one or more accessory ports 130. As one example, the accessory device 102 may be an external hub having multiple ports 130. As another example, the accessory device 102 may be a battery that can supply power to device 100, but also includes another accessory interface port 130 in order to not completely tie up access to device 100. In such an embodiment, engine 124 may evaluate a policy with respect to each of those external ports 130 individually. Accordingly, in the example of the battery having an accessory port 130, engine 124 may enable device 100's internal accessory interface port 130 to allow negotiation of a higher charging rate with the battery, but determine that the battery's port 130 satisfies criteria for restricting access and cause the battery's port 130 to be disabled.

Figure 2:
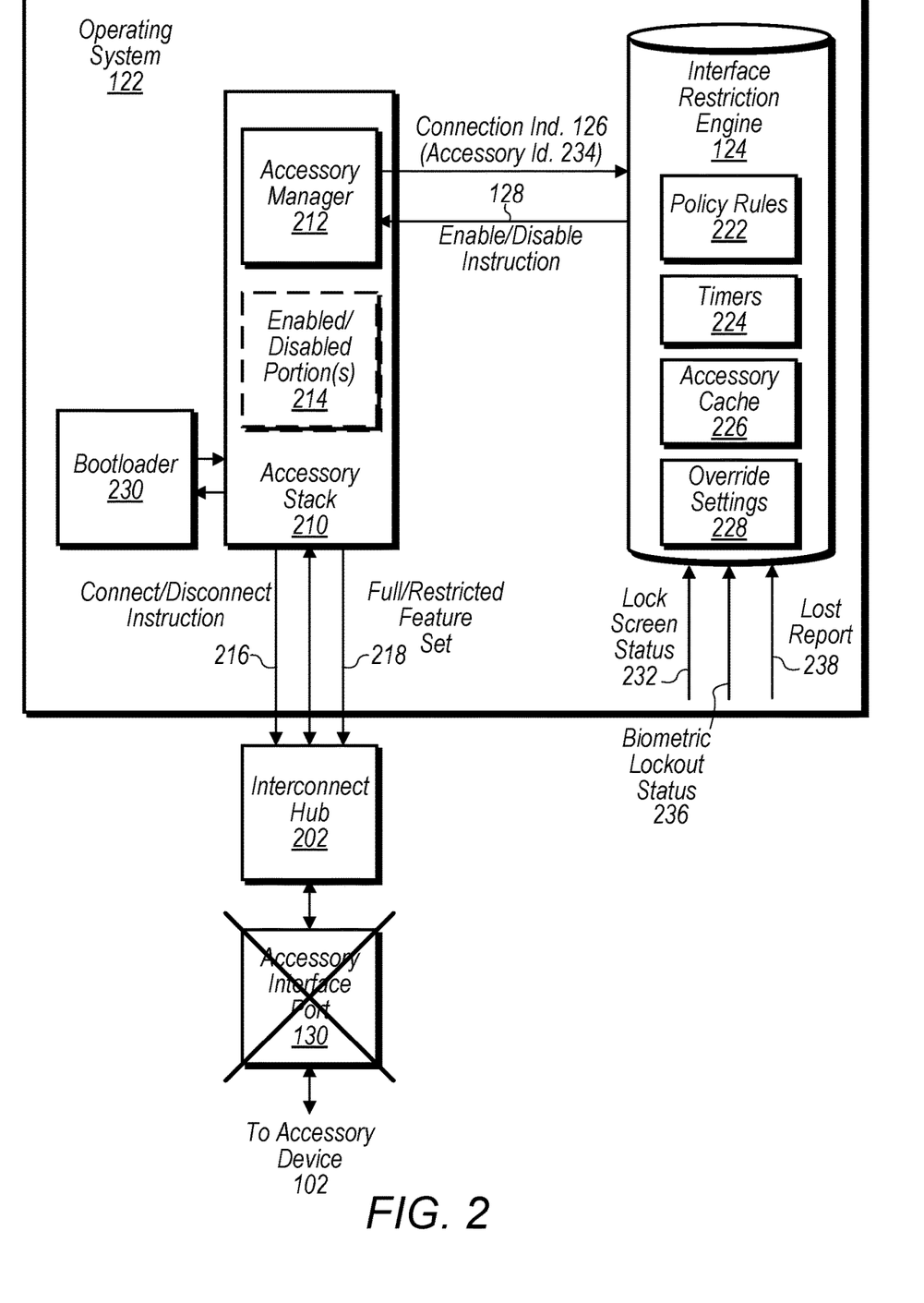
FIG. 2 is a block diagram illustrating an example of an operating system of the computing device that includes an interface restriction engine.

Turning now to FIG. 2, a block diagram of operating system 122 including interface restriction engine 124 is depicted. In the illustrated embodiment, OS 122 includes an accessory stack 210 having an accessory manager 212 and enabled/disabled portion 214. As shown, interface restriction engine 124 includes policy rules 222, timers 224, accessory cache 226, and override settings 228. OS 122 may also include (or be associated with) a bootloader 230. In some embodiments, OS 122 may be implemented differently than shown.

Accessory stack 210, in various embodiments, is a network/communication stack operable to facilitate communication via port 130 with accessory device 102 and may implement one or more layers of the Open Systems Interconnection (OSI) model such as the data-link, network, and transport layers. Accordingly, stack 210 may include one or more driver processes, which may run at one or more kernel levels (e.g., x86 Rings 0-2) and/or user level (x86 Ring 3). In the illustrated embodiment, accessory stack 210 relies on accessory manager 212 to facilitate interfacing with interface restriction engine 124 such as sending a connection indication 126 and receiving a corresponding enable or disable instruction 128 to enable or disable port 130. In some embodiments, manager 212 may further handle enabling and disabling portions 214 of stack 210 (or the entire stack 210), interfacing with interconnect 140 including interconnect hub 202 discussed below, and/or advertising what features are supported by port 130.

Policy rules 222, in various embodiments, are a collection of rules making up the policy being evaluated by interface restriction engine 124. As noted above, rules 222 may specify any suitable criteria indicative of whether an authorized or unauthorized user has connected an accessory device 102. For example, in some embodiments, policy rules 222 may include a rule 222 that port 130 be placed in restricted mode if 1) a lock screen is displayed as indicated by lock screen status 232 and 2) no accessory device 102 has been connect within a particular time interval (e.g., two days) as indicated by a timer 224 discussed below. As used herein, the term "lock screen" is to be interpreted in accordance with its understood meaning in the art and includes a prompt presented on a display to indicate to the user that access to the computing device is restricted/locked. Such a prompt may, for example, instruct a user to authenticate with the computing device by entering a passcode or performing a biometric authentication in order to gain access to computing device 100. Accordingly, lock screen status 232 may be provided by OS 122 to indicate whether a lock screen is currently being displayed and in conjunction with a timer 224 indicate how long a lock screen has been displayed. In some embodiments, policy rules 222 include a rule 222 that port 130 be placed in restricted mode if 1) it has been more than a particular amount of time (e.g., more than one hour) that a lock screen has been displayed or an accessory device 102 was disconnected and 2) an accessory device 102 has been connect within a particular time interval (e.g., two days). In some embodiments, policy rules 222 include a rule 222 that port 130 be placed in restricted mode if 1) a lock screen has been displayed for a particular amount of time (e.g., up to one hour), 2) an accessory device 102 has been connect within a particular time interval (e.g., two days), and 3) a newly connected accessory device 102 is unknown to computing device 100 as determined by its accessory identifier 234 and accessory cache 226 discussed below.

In some embodiments, policy rules 222 include a rule 222 that port 130 be placed in restricted mode if a "biometric lockout" has occurred as indicated by biometric lockout status 236. As will be described below with respect to FIG. 4, computing device 100 may include a biometric sensor configured to collect biometric data from a user of the computing device and a secure circuit configured to perform a biometric authentication by comparing the collected biometric data with biometric data of an authorized user. If a particular number of failed biometric authentication attempts has occurred, the secure circuit may determine to discontinue performing biometric authentications, and computing device 100 may ask the user to authenticate in a different manner such as by providing a passcode. This refusal to perform subsequent biometric authentications may be referred to as a biometric lockout and may be indicated via biometric lockout status 236 provided by the secure circuit.

In some embodiments, policy rules 222 include a rule 222 that port 130 be placed in restricted mode if a user reports computing device 100 as being lost as indicated by a received lost report 238. Accordingly, computing device 100 may periodically receive notifications from a cloud service accessible to a user via a website or one or more other devices associated with the user. If the user misplaces device 100, the user can access the cloud service to report device 100 as being lost. In response, device 100 may receive a lost report 238 from the cloud service via a network interface of computing device 100, lost report 238 being a notification that a user has reported computing device 100 to the cloud service as being lost. In response to receiving report 238, engine 124 may determine, based on the rule 222, that port 130 is to be placed in restricted mode.

In some embodiments, policy rules 222 may include rules 222 that are dynamically generated or altered based on an analysis of user behavior, which may be performed by engine 124. For example, engine 124 may receive information about one or more locations frequently visited by a user and include a rule 222 to enter restricted mode if device 100's location has moved outside these locations (or may relax criteria of a rule 222 if a user is within one of these locations). As another example, a user may create a way to determine that he or she is going to sleep (e.g., by creating a goodnight routine, giving device 100 the ability to control bedroom lights, etc.), and engine 124 may add a rule 222 to enter restricted mode based on a subsequently received indication that a user is going to sleep (e.g., a request to run the goodnight routine, a request to turn off the bedroom lights, etc.). In some embodiments, engine 124 may attempt to identify other patterns of user behavior and add rules to enable or disable port 130 based on compliance or deviation from those patterns such as a user consistently connecting device 100 to a vehicle each weekday morning on the way to work.

Timers 224, in various embodiments, track various time values being assessed by engine 124 when evaluating policy rules 222. For example, as noted above, one of timers 224 may maintain a time value indicating a period since an accessory device was connected to the accessory interface. Accordingly, engine 124 may compare this time value against a threshold value defined by a criterion of a rule 222 in order to determine whether the criterion is satisfied. In some embodiments, another of timers 224 may maintain a time value identifying how long a lock screen has been presented on a display of computing device. In some embodiments, timers 224 are implemented using counters that are periodically incremented; however, in other embodiments, timers 224 are implemented by recording a time value/timestamp and subtracting the time value from the current time, which may be maintained by a clock circuit of computing device 100. Thus, a timer 224 may be able to indicate how a lock screen was displayed by recording the time value when the lock screen was initially displayed and subtracting the time value from the current time.

Accessory cache 226, in various embodiments, is a stored set of accessory device identifiers 234 that correspond to accessory devices 102 that were previously connected to accessory interface port 130. Accordingly, when an accessory device 102 is connected to port 130, the device 102 may convey a unique accessory identifier 234, which engine 124 may receive in conjunction with a connection indication 126. Engine 124 may then compare the newly received identifier 234 against those in cache 226 to determine whether the accessory device 102 was previously connected/known to computing device 100. In some embodiments, policy rules 222 may provide a small grace period for previously connected devices 102 that were able to use port 130 as this may be an indicium that the accessory device 102 is trustworthy—and potentially connected by an authorized user. In some embodiments, engine 124 may periodically purge accessory identifiers 234 from accessory cache 226. For example, if a particular accessory device 102 has not been connected to port 130 within the last thirty days, engine 124 may remove its accessory identifier 234 from cache 226—thus, on a subsequent connection, the accessory device 102 may be treated as unknown to computing device 100 in spite of its previous connection.

Override settings 228, in various embodiments, may allow an authorized user to adjust policy rules 222 and/or prevent accessory interface port 130 from being disabled. For example, in some instances, a visually-, auditorily-, or motor-impaired user may want to continually enable accessory interface port 130 for an assisting accessory device 102 such as a switch control (e.g., used to unlock device 100 and interface with a touch display of device 100), a braille display, audio device, etc. Override settings 228 may be set using a menu provided operating system 122 and/or installing a profile on device 100 to set override settings 228. Settings 138 may thus be used to prevent engine 124 for undermining the user experience for a user that does not want to place accessory interface port 130 into restricted mode.

As noted above, in some embodiments, in response to receiving an instruction 128 to enable or disable port 130, manager 212 may implement this instruction by enabling and disabling one or more portions 214 of accessory stack 210 to allow or inhibit communication via port 130. In various embodiments, portions 214 may correspond to a particular protocol supported by port 130 and/or different layers of accessory stack 210. For example, in response to determining to disable port 130, manager 212 may not bring up portions 214 of stack 210 that implement the USB protocol in an embodiment when USB is one of the protocols supported by port 130. Conversely, in response to determining to enable accessory interface port 130, manager 212 may initialize accessory stack 210 including portions 214 to process packets communicated via port 130 with accessory device 102.

In some embodiments, manager 212 implements enable/disable instruction 128 by also sending an instruction 216 to hardware of interconnect 140, such as interconnect hub 202, to prevent or allow the routing of traffic from port 130. In the illustrated embodiment, interconnect hub 202 is a circuit configured to multiplex traffic from different circuits coupled to interconnect including port 130. Accordingly, in response to receiving an instruction 216 to disconnect port 130, hub 202 may determine to drop any received from port 130 and/or destined to port 130 in order to prevent communication via port 130. In some embodiments, manager 212 may further cause accessory port 130 to be power gated and/or clock gated in response to disconnecting port 130 from interconnect 140.

In some embodiments, manager 212 implements enable/disable instruction 128 by advertising a full or restricted feature set 218 to accessory device 102 via port 130. For example, in response to receiving an instruction 128 to enable port 130, manager 212 may advertise that port 130 supports a charging capability, USB, Thunderbolt™, and DisplayPort™. In response to receiving an instruction 128 to disable port 130, manager 212 may advertise only the charging capability—a subset of the features available via accessory interface port 130 when port 130 is not placed into the restricted mode.

As will be discussed below with respect to FIG. 3, in some instances, an accessory device 102 may be connected to accessory interface port 130 while computing device 100 is turned off—and thus OS 122 may not yet be executing to have engine 124 evaluate whether to enable or disable port 130. In various embodiments, bootloader 230 is executable to load/boot strap OS 122 in response to an accessory device 102 being connected to port 130 in order for an evaluation to be performed. In some embodiments, bootloader 230 may determine a charge level of a battery supplying power to computing device 100 and delay booting OS 122 until the charge level reaches a sufficient level. As will be discussed, this charging may occur an initial lower default rate until port 130 can be enabled to negotiate a subsequent higher charging rate.

Figure 3:
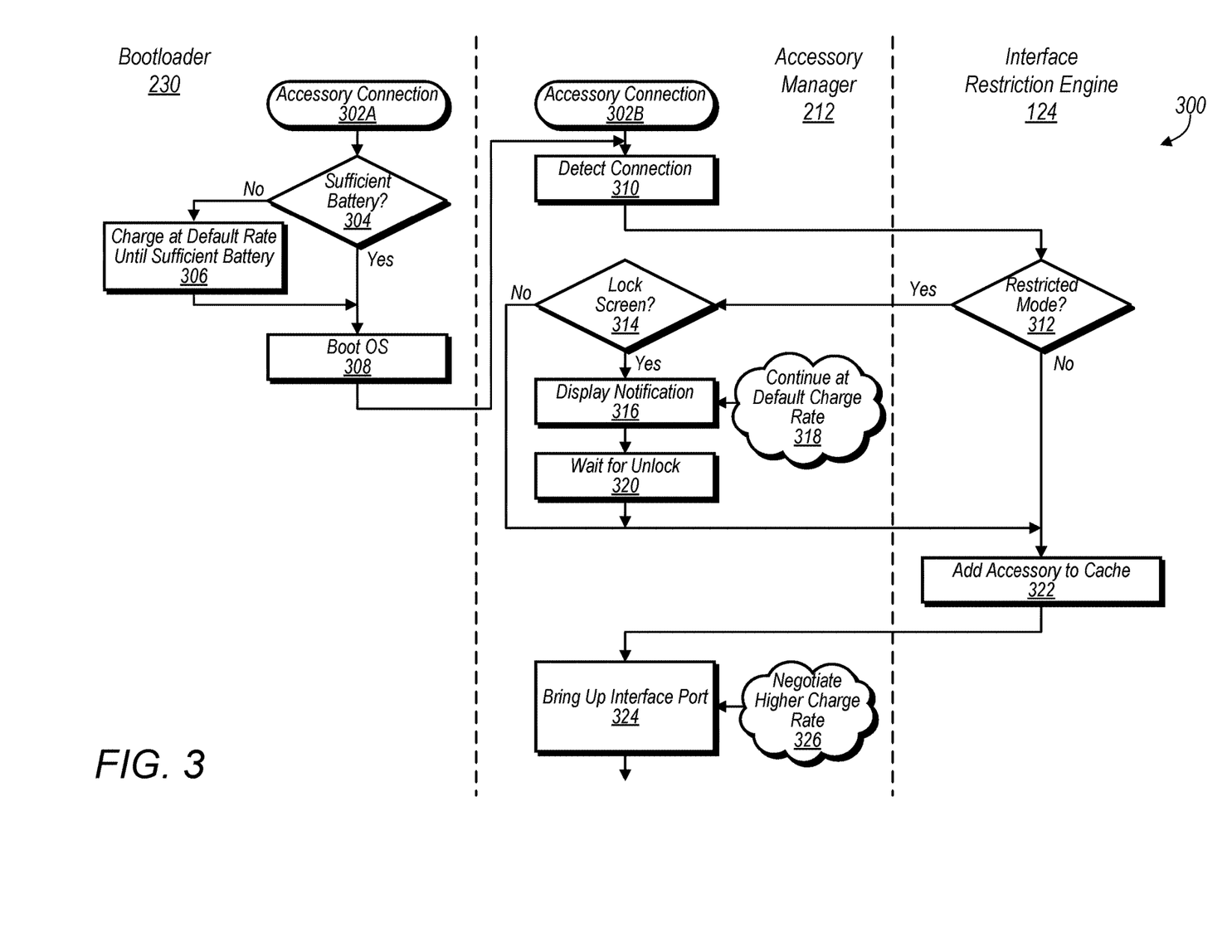
FIG. 3 is a flow diagram illustrating an example of bringing up an accessory interface after connection of an accessory device.

Turning now to FIG. 3, a flow diagram illustrating a process 300 for bringing up accessory interface port 130 is depicted. In the illustrated embodiment, process 300 may begin at step 302A or step 302B depending on whether OS 122 is currently booted. As shown, if OS 122 has not let been loaded by bootloader 230, process 300 may begin at 302A in which an accessory device 102 is connected to accessory port 130 causing execution of bootloader 230 to be initiated. At step 304, bootloader 230 may determine a supply level of a battery of the computing device in order assess whether there is a sufficient amount of battery charge to load OS 122. If there is not a sufficient amount and bootloader 230 has detected an ability of accessory device 102 to provide power to computing device 100, bootloader 230 may delay booting OS 122 and proceed to step 306 in which accessory device 102 is permitted to charge a battery of computing device 100. In some embodiments, this charging occurs a lower default rate until a higher rate can be negotiated with accessory device 102—assuming it supports multiple rates. Once the charge of the battery satisfies a particular threshold sufficient to boot OS 122, bootloader 230 may boot OS 122 at step 308.

After OS 122 has been successfully loaded and is executing, more information about the connection of an accessory device 102 may be detected at step 310 such as the accessory identifier 234, etc. This information may then be conveyed by accessory manager 212 to interface restriction engine 124, which may evaluate policy rules 222 to determine, at step 312, whether accessory port 130 is to be placed into restricted mode as discussed above. If engine 124 determines to not place port 130 into restricted mode (i.e., port 130 is being placed into standard/unrestricted mode), process 300 proceeds to step 322. Otherwise, process 300 proceeds to step 314.

At step 314, a determination is made based on rules 222 of whether a lock screen is being depicted on a display of computing device 100. (In some embodiments, step 314 may be considered as a component of the analysis in step 312). In response to determining that accessory port 130 is to be placed in restricted mode and a lock screen is being presented, a notification is presented on the lock screen at 316 to instruct a user to authenticate to computing device 100 in order to approve use of accessory device 102. In some embodiments, the notification may instruct the user to perform a biometric authentication as discussed below with FIG. 4 or enter a passcode to authenticate. In various embodiments, computing device 100 may continue at step 318 to receive power from accessory device at the default unnegotiated rate until device 100 is unlocked at 320 by the user being authenticated to authorize enabling port 130.

At step 322, if enabling port 130 has been approved by an authorized user (as determined by the user authentication) or if port was not placed into restricted mode, the accessory identifier 234 of the connected accessory device 102 is added to accessory cache 226, so that it can be considered at step 312 during a subsequent performance of process 300. Accessory manager 212 may then bring up interface port 130 at step 324, which may include enabling accessory stack 210 (including portions 214), instructing hub 202 to appropriately route traffic from port 130, and/or advertising a full feature set 218 as discussed above. At step 326, accessory manager 212 may also negotiate a second higher rate with accessory device 102 and begin receiving power from the accessory device 102 at the second higher negotiated rate. Process 300 may then continue with computing device 100 using an enabled accessory interface port 130 to communicate with the connected accessory device 102.

Figure 4:
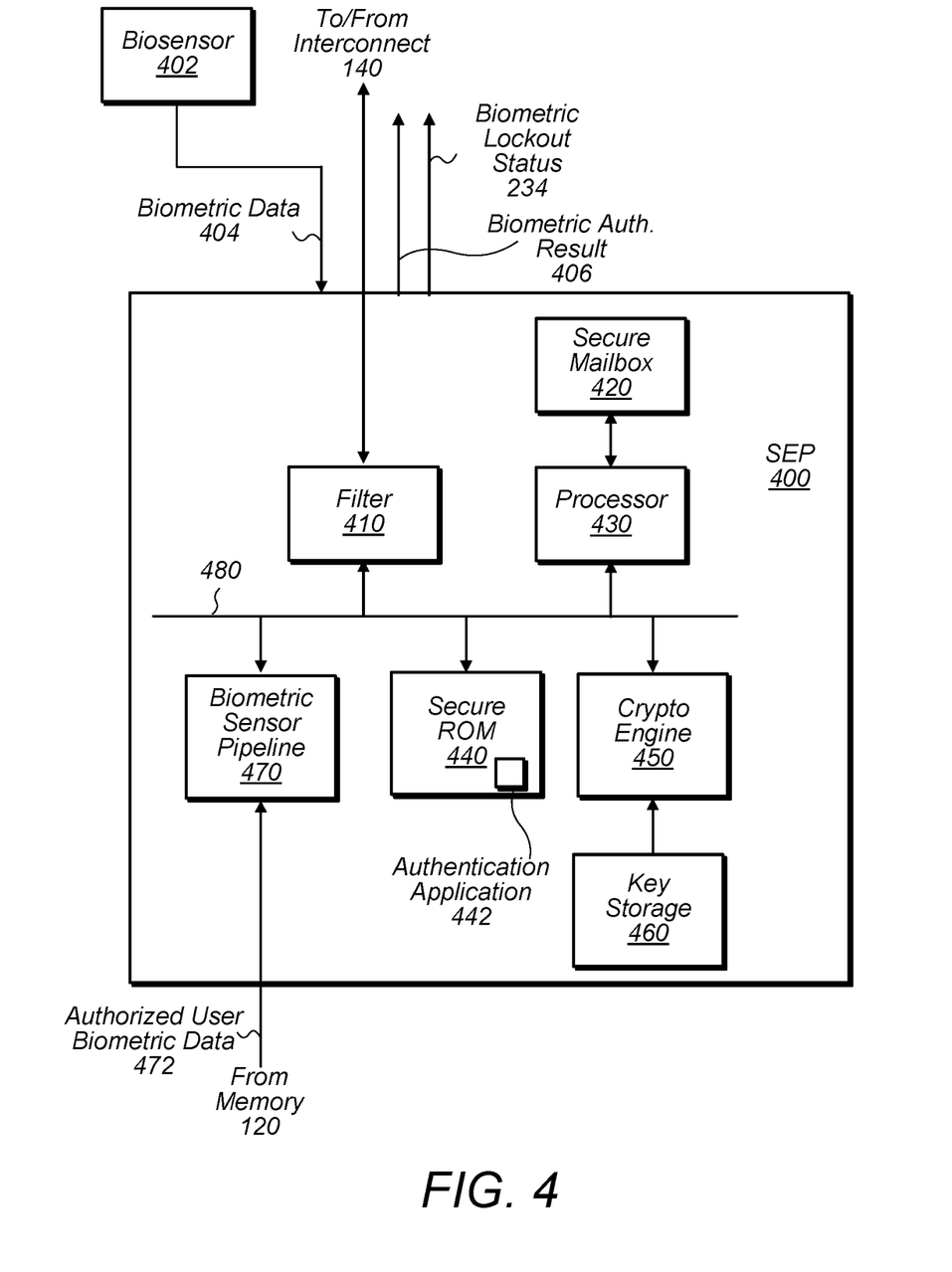
FIG. 4 is a block diagram illustrating a secure circuit configured to perform a biometric authentication associated with bringing up the accessory interface.

Turning now to FIG. 4, a block diagram of a secure enclave processor (SEP) 400 is depicted. In various embodiments, SEP 400 is a secure circuit configured to authenticate an active user (i.e., the user that is currently using device 100). As used herein, the term "secure circuit" refers to a circuit that protects an isolated, internal resource from being directly accessed by an external circuit. This internal resource may be memory that stores sensitive data such as personal information (e.g., biometric information, credit card information, etc.), encryptions keys, random number generator seeds, etc. This internal resource may also be circuitry that performs services/operations associated with sensitive data. As will be described below, this circuitry may include a biometric sensor pipeline that is configured to verify biometric data 404 captured by biosensor 402 for a user by comparing it with previous collected biometric data of an authorized user. As noted above, in various embodiments, SEP 400 is configured to discontinue performing biometric authentications in response to a particular number of failed biometric authentication attempts. Accordingly, SEP 400 may provide biometric lockout status 236 to indicate whether it is still performing biometric authentications or has discontinued performing biometric authentications—in which case, a user may be requested to authenticate by providing a passcode in some embodiments.

Biosensor 402, in one embodiment, is configured to detect biometric data for a user of computing device 100. As used herein, "biometric data" refers to data that uniquely identifies the user among other humans (at least to a high degree of accuracy) based on the user's physical or behavioral characteristics. Biosensor 402 may use any suitable technique to collect biometric data 404. For example, in some embodiments, biosensor 402 is a finger print sensor that captures fingerprint data from the user. Accordingly, SEP 400 may maintain previously captured fingerprint data of an authorized user and compare it against newly received fingerprint data from biosensor 402 in order to authenticate a user. In some embodiments, biosensor 402 collects other types of biometric data 404 such as voice recognition (identifying the particular user's voice), iris scanning, etc. In still other embodiments, biosensor 402 may include an infrared (IR) emitter and an IR camera that are configured to capture multiple flood and depth image frames. When capturing a flood frame, the IR emitter may emit light from a single source, and the IR camera may collect two-dimensional image data from a user's face. When capturing a depth image frame, the IR emitter may project multiple light sources onto a user's face, and the IR camera may capture the reflections of those light sources to determine multiple depth points indicating distances from the IR camera to respective portions of the user's face. In some embodiments, the combination of flood and depth image data may allow for SEP 400 to compare faces in a three-dimensional space. In other embodiments, biosensor 402 is configured to capture a two-dimensional image in the visible-light spectrum. In various embodiments, biosensor 402 communicates biometric data 404 to SEP 400 via a secure channel. As used herein, the term "secure channel" refers to either a dedicated path for communicating data (i.e., a path shared by only the intended participants) or communicating encrypted data using cryptographic keys known only to the intended participants.

As shown in the illustrated embodiment, SEP 400 includes a filter 410, secure mailbox 420, processor 430, secure ROM 440, cryptographic engine 450, a key storage 460, and an biometric sensor pipeline 470 coupled together via an interconnect 480. In some embodiments, SEP 400 may include more (or less) components than shown in FIG. 4. As noted above, SEP 400 is a secure circuit that protects an internal, resource such as components cryptographic keys in storage 460 and/or image sensor pipeline 470. In various embodiments, SEP 400 implements a secure circuit through the use of filter 410 and secure mailbox 420.

Filter 410 is circuitry configured to tightly control access to SEP 400 to increase the isolation of the SEP 400 from the rest of the computing device 100, and thus the overall security of the device 100. More particularly, in one embodiment, filter 410 may permit read/write operations from a CPU 110 (or other peripherals on interconnect 140 coupling CPU 110 and SEP 400) to enter SEP 400 only if the operations address the secure mailbox 420. Other operations may not progress from the interconnect 140 into SEP 400. Even more particularly, filter 410 may permit write operations to the address assigned to the inbox portion of secure mailbox 420, and read operations to the address assigned to the outbox portion of the secure mailbox 420. All other read/write operations may be prevented/filtered by the filter 410. In some embodiments, filter 410 may respond to other read/write operations with an error. In one embodiment, filter 410 may sink write data associated with a filtered write operation without passing the write data on to local interconnect 480. In one embodiment, filter 410 may supply nonce data as read data for a filtered read operation. Nonce data (e.g., "garbage data") may generally be data that is not associated with the addressed resource within the SEP 400. Filter 410 may supply any data as nonce data (e.g. all zeros, all ones, random data from a random number generator, data programmed into filter 410 to respond as read data, the address of the read transaction, etc.). In various embodiments, filter 410 may only filter incoming read/write operations. Thus, the components of the SEP 400 may have full access to the other components of computing device 100 including CPU 110, memory 120, accessory interface port 130, and/or biosensor 402. Accordingly, filter 410 may not filter responses from interconnect 140 that are provided in response to read/write operations issued by SEP 400.

Secure mailbox 420 is circuitry that, in some embodiments, includes an inbox and an outbox. Both the inbox and the outbox may be first-in, first-out buffers (FIFOs) for data. The buffers may have any size (e.g., any number of entries, where each entry is capable of storing data from a read/write operation). Particularly, the inbox may be configured to store write data from write operations sourced from CPU 110. The outbox may store write data from write operations sourced by processor 430. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on CPU 110 (e.g., OS 122 or engine 124) may request services of SEP 400 via an application programming interface (API) supported by an operating system of computing device 100—i.e., a requester may make API calls that request services of SEP 400. These calls may cause corresponding requests to be written to mailbox mechanism 420, which are then retrieved from mailbox 420 and analyzed by processor 430 to determine whether it should service the requests. Accordingly, this API may be used to deliver biometric data 404 to mailbox 420, request authentication of a user by verifying this information, and delivering an authentication result 406 as well as biometric lockout status via mailbox 420. By isolating SEP 400 in this manner, integrity of biometric sensor pipeline 470, for example, may be enhanced.

SEP processor 430 is configured to process commands received from various sources in computing device 100 (e.g. from CPU 110) and may use various secure peripherals to accomplish the commands. Processor 430 may then execute instructions stored in ROM 440 such as authentication application 442 to perform an authentication of a user. For example, SEP processor 430 may execute application 442 to provide appropriate commands to biometric sensor pipeline 470 in order to verify biometric data 404. In some embodiments, authentication application 442 may track a number of failed attempts at performing a biometric authentication, determine to discontinue performing biometric authentication attempts, and provide biometric lockout status 236 as discussed above. In some embodiments, application 442 may include encrypted program instructions loaded from a trusted zone in memory 120.

Secure ROM 440 is a memory configured to store program instruction for booting SEP 400. In some embodiments, ROM 440 may respond to only a specific address range assigned to secure ROM 440 on local interconnect 480. The address range may be hardwired, and processor 430 may be hardwired to fetch from the address range at boot in order to boot from secure ROM 440. Filter 410 may filter addresses within the address range assigned to secure ROM 440 (as mentioned above), preventing access to secure ROM 440 from components external to the SEP 400. In some embodiments, secure ROM 440 may include other software executed by SEP processor 430 during use. This software may include the program instructions to process inbox messages and generate outbox messages, etc.

Cryptographic engine 450 is circuitry configured to perform cryptographic operations for SEP 400, including key generation as well as encryption and decryption using keys in key storage 460. Cryptographic engine 450 may implement any suitable encryption algorithm such as DES, AES, RSA, etc. In some embodiments, engine 450 may further implement elliptic curve cryptography (ECC). In various embodiments, engine 450 is responsible for decrypting traffic received from biosensor 402.

Key storage 460 is a local memory (i.e., internal memory) configured to store cryptograph keys. In some embodiments, these keys may include keys used to establish the secure channels between SEP 400 and biosensor 402. In some embodiments, keys maintained in key storage 460 may be used to encrypt data stored in memory 120 in order to further secure device 100.

Biometric sensor pipeline 470, in one embodiment, is circuitry configured to compare biometric data 404 captured from a user being authenticated with biometric data 472 of an authorized user. In some embodiments, pipeline 470 may perform the comparison using a collection of neural networks included in pipeline 470, each network being configured to compare biometric data 404 captured in a single frame with biometric data 472 captured in multiple frames for an authorized user. As shown, pipeline 470 may be configured to read, from memory 120, biometric data 472, which may be protected by encryption in some embodiments or being stored in an associated part of memory 120 that is only accessible to SEP 400. (In another embodiment, SEP 400 may store data 472 internally.) Based on the comparison of biometric data 404 and 472, SEP 400 may provide an authentication result 406 indicating whether the authentication was successful or failed—and indicate a biometric lockout status 236 indicating a lockout after multiple failed attempts.

Figure 5A:
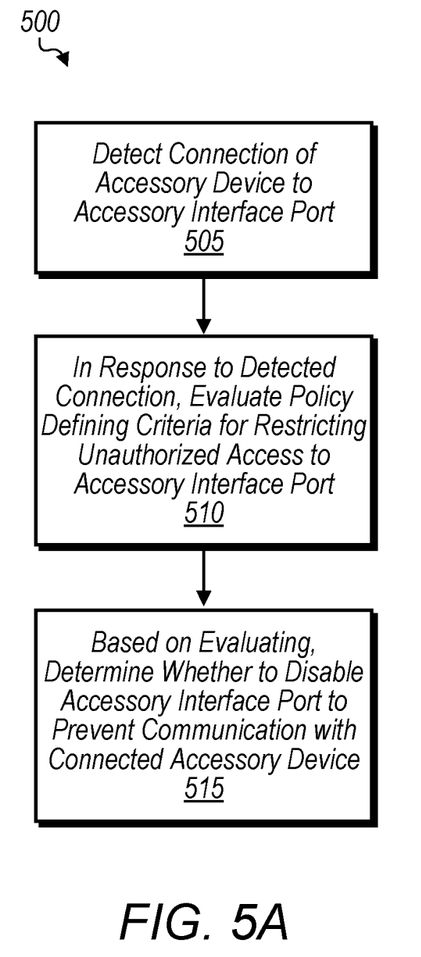
FIGS. 5A-C are flow diagrams illustrating examples of methods for securing an accessory interface.

Turning now to FIG. 5A, a flow diagram of a method 500 is depicted. Method 500 is one embodiment of a method performed by a computing device configured to secure an accessory interface port such as accessory interface port 130. In some instances, performance of method 500 improves the overall security of the computing device.

In step 505, the computing device detects a connection of an accessory device (e.g., accessory device 102) to the accessory interface port. In various embodiments, the detecting includes determining that the accessory device is capable of supplying power to the computing device via the accessory interface port and receiving power supplied from the accessory device at a first default rate prior to determining whether to disable the accessory interface port. In some embodiments, the computing device determines, in response to detecting the connection, a supply level (e.g., step 304) of a battery of the computing device and, based on the determined supply level, charges (e.g., step 306) the battery using the power received via the accessory interface port. In such an embodiment, in response to the charging causing the supply level to satisfy a threshold level, the computing device initiates a bootloader (e.g., bootloader 230 and step 308) to load an operating system (operating system 122) of the computing device, the operating system being executable to perform the evaluating of the policy.

In step 510, the computing device evaluates, in response to the detected connection, a policy (e.g., policy rules 222) defining one or more criteria for restricting unauthorized access to the accessory interface port. In some embodiments, the evaluating includes determining (e.g., based on lock screen status 232) whether a lock screen is being depicted on a display of the computing device and evaluating a rule of the policy, the rule identifying the lock screen being displayed as a criterion for restricting access to the accessory interface port. In some embodiments, the evaluating includes determining (e.g., based on a timer 224) a time since a previous accessory device was connected to the accessory interface port, and one of the criteria is based on the determined time satisfying a threshold. In some embodiments, the evaluating includes accessing a stored set of accessory device identifiers (e.g., identifiers 234 in accessory cache 226) that correspond to accessory devices that were previously connected to the accessory interface port. In such an embodiment, one of the criteria is based on the connected accessory device having an accessory device identifier included in the stored set. In some embodiments, a secure circuit (e.g., SEP 400) of the computing device performs a biometric authentication by comparing the collected biometric data with biometric data of an authorized user and discontinues performing biometric authentications (e.g., as indicated by biometric lockout status 236) in response to a particular number of failed biometric authentication attempts. In such an embodiment, one of the criteria is based on whether the secure circuit has discontinued performing biometric authentications.

In step 515, based on the evaluating, the computing device determines whether to disable the accessory interface port to prevent communication with the connected accessory device. In various embodiments, in response to determining to disable the accessory interface port, the computing device instructs a hub circuit (e.g., hub 202) to prevent traffic from being conveyed from the accessory interface port. In some embodiments, in response to determining to disable the accessory interface port, the computing device presents, on a lock screen of the computing device, a notification (e.g., step 316) instructing a user to authenticate to the computing device to enable use of the accessory device. In some embodiments, in response to determining to not disable the accessory interface port, the computing device communicates with the accessory device via the accessory interface port to negotiate (e.g., step 326) a second rate to supply power and receives power supplied from the accessory device at the negotiated second rate.

Figure 5B:
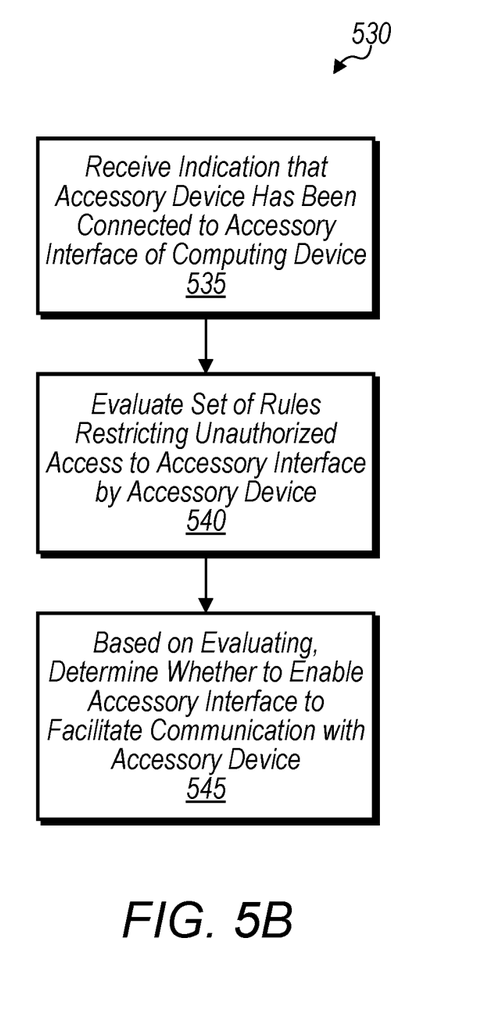

Turning now to FIG. 5B, a flow diagram of a method 530 is depicted. Method 530 is one embodiment of a method performed by an operating system (or generally a computing device) executable to secure an accessory interface port such as accessory interface port 130. In some instances, performance of method 530 improves the overall security of the computing device.

In step 535, an indication (e.g., connection indication 126) is received that an accessory device (e.g., accessory device 102) has been connected to an accessory interface of the computing device. In various embodiments, step 535 includes detecting an ability of the accessory device to provide power to the computing device and, based on the detected ability, permitting the accessory device to charge (e.g., step 306) a battery of the computing device. In some embodiments, in response to a charge of the battery satisfying a particular threshold, the operating system of the computing device is booted (e.g., via bootloader 230), the operating system being executable to perform the evaluating and the determining.

In step 540, a set of rules (e.g., rules 222) restricting unauthorized access to the accessory interface by the accessory device is evaluated. Is some embodiments, step 540 includes determining a first time value (e.g., based on a first timer 224) indicating a period since an accessory device was connected to the accessory interface and determining a second time value (e.g., based on a second timer 224) indicating a period that a lock screen has been displayed by the computing device, and evaluating a rule to enable the accessory interface based on the first and second time values.

In step 545, a determination based on the evaluating is made for whether to enable the accessory interface to facilitate communication with the accessory device. In various embodiments, in response to determining to enable the accessory interface, a network stack of an operating system of the computing device initiated (e.g., by enabling portion 214), the network stack being executable to process packets communicated via the accessory interface with the accessory device. In some embodiments, a notification (e.g., lost report 238) is received via a network interface and from a cloud service associated with the computing device, the notification being that a user has reported the computing device to the cloud service as being lost. In such an embodiment, a determination is made to not enable the accessory interface based on one of the set of rules indicating that the accessory interface is to be disabled in response to the notification.

Figure 5C:
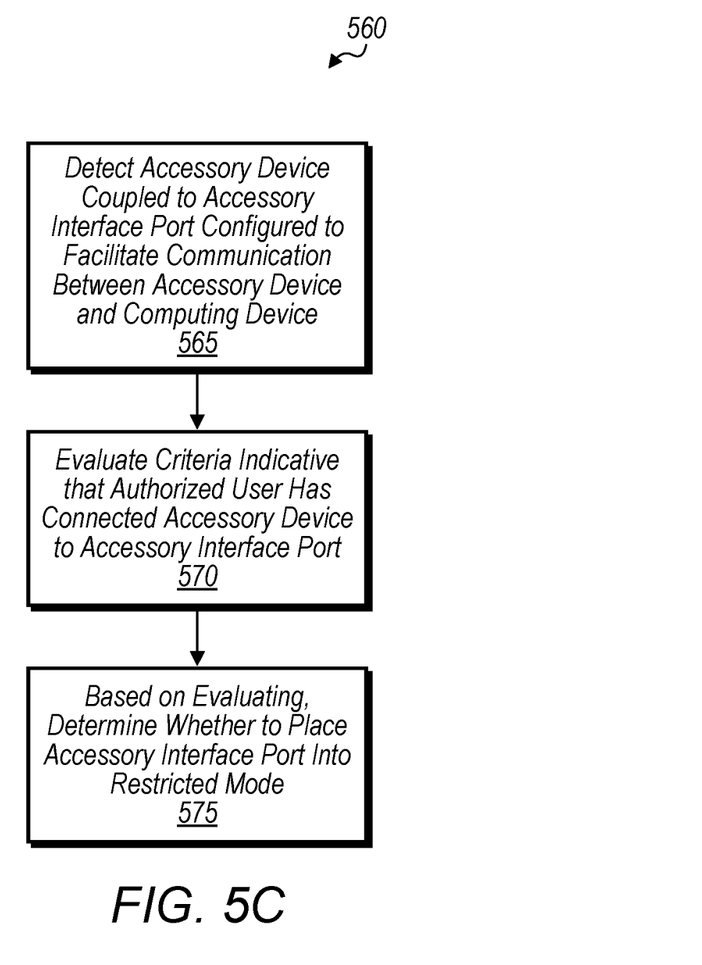

Turning now to FIG. 5C, a flow diagram of a method 560 is depicted. Method 560 is one embodiment of a method performed by a computing device configured to secure an accessory interface port such as accessory interface port 130. In some instances, performance of method 500 improves the overall security of the computing device.

In step 565, a computing device detects an accessory device (e.g., accessory device 102) coupled to an accessory interface port (e.g., port 130) of the computing device. In various embodiments, the accessory interface port is configured to facilitate communication between the accessory device and the computing device. In some embodiments, the computing device further detects that the accessory device is configured to supply power to the computing device and receives power (e.g., steps 306 and 318) supplied by the accessory device at a first unnegotiated rate.

In step 570, the computing device evaluates one or more criteria (e.g., specified by rules 222) indicative that an authorized user has connected the accessory device to the accessory interface port of the computing device. In various embodiments, the computing device records a first time value (e.g., associated with a first timer 224) identifying when an accessory device was last connected to the accessory interface port and records a second time value (e.g., associated with a second timer 224) identifying when display of a lock screen was initiated. In some embodiments, the evaluating includes comparing the first time value with a first threshold specified by the one or more criteria and comparing the second time value with a second threshold specified by the one or more criteria. In some embodiments, the computing device records identifiers (e.g., identifiers 234 in accessory cache 226) for accessory devices that previously connected to the accessory interface port and determines an identifier for the connected accessory device, and the evaluating includes determining whether the determined identifier is one of the recorded identifiers.

In step 575, the computing device determines, based on the evaluating, whether to place the accessory interface port into a restricted mode that restricts access of the accessory device to the computing device via the accessory interface port. In some embodiments, the computing device, in response to determining to place the accessory interface port into the restricted mode, advertises a reduced set of features (e.g., restricted feature set 218) available to the accessory device via the accessory interface port, the reduced set of features including fewer features than a set of features available via the accessory interface port when the accessory interface port is not placed into the restricted mode. In some embodiments, in response to determining to not place the accessory interface port into the restricted mode, the computing device negotiates (e.g., step 326), via the accessory interface port, a second rate that is higher than the first unnegotiated rate and receives power from the accessory device at the second higher negotiated rate.

Exemplary Computer System

Figure 6:
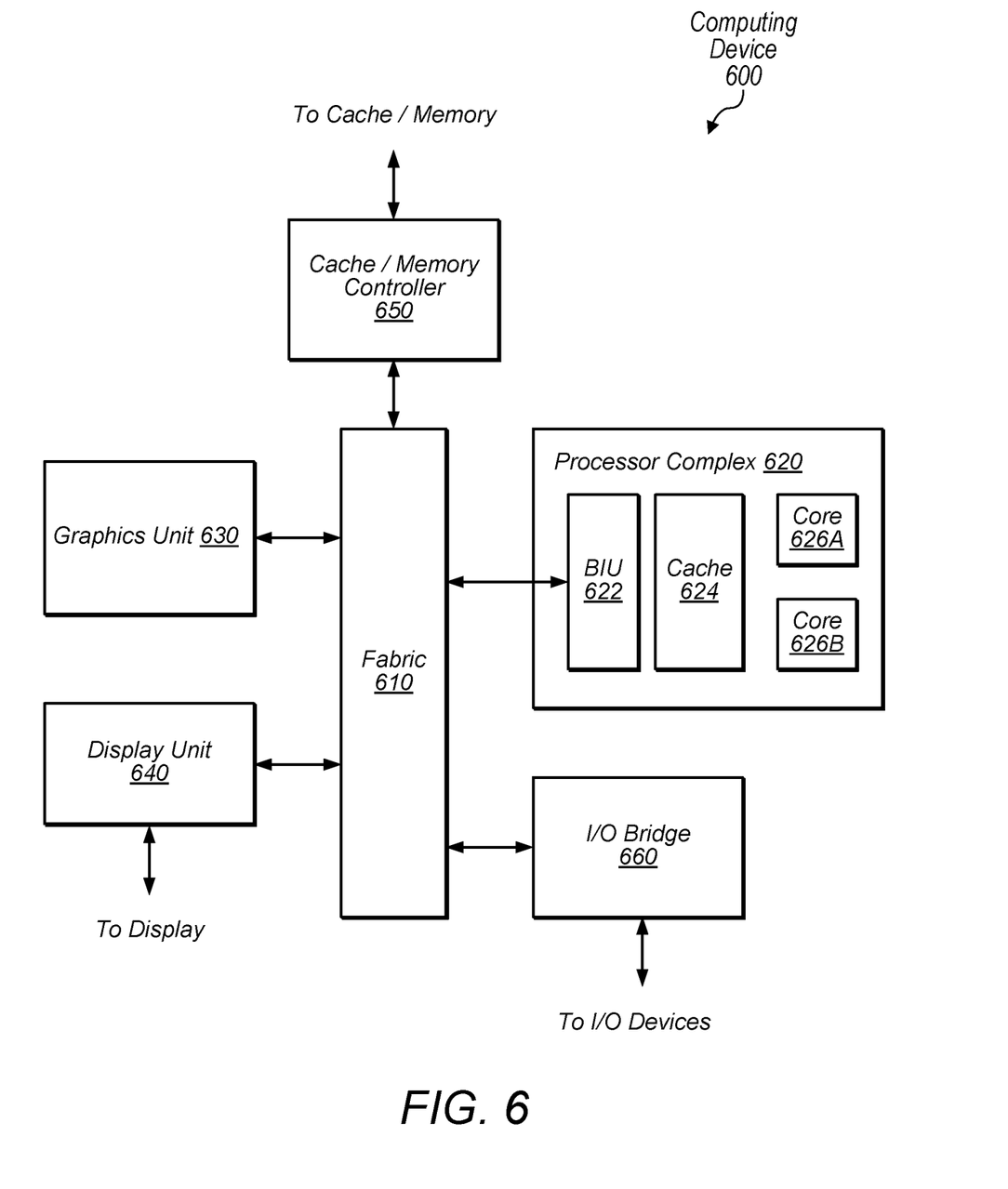
FIG. 6 is a block diagram illustrating one embodiment of an exemplary computer system.

Turning now to FIG. 6, a block diagram illustrating an exemplary embodiment of a computing device 600, which may implement functionality of computing device 100, is shown. Device 600 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In the illustrated embodiment, device 600 includes fabric/interconnect 610, processor complex 620, graphics unit 630, display unit 640, cache/memory controller 650, input/output (I/O) bridge 660. In some embodiments, elements of device 600 may be included within a system on a chip (SOC).

Fabric/interconnect 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally. As used herein, the term "coupled to" may indicate one or more connections between elements, and a coupling may include intervening elements. For example, in FIG. 6, graphics unit 630 may be described as "coupled to" a memory through fabric 610 and cache/memory controller 650. In contrast, in the illustrated embodiment of FIG. 6, graphics unit 630 is "directly coupled" to fabric 610 because there are no intervening elements. In some embodiments, fabric 610 may include or correspond to interconnect 140 discussed above.

In the illustrated embodiment, processor complex 620 includes bus interface unit (BIU) 622, cache 624, and cores 626A and 626B. In various embodiments, processor complex 620 may include various numbers of processors, processor cores and/or caches. For example, processor complex 620 may include 1, 2, or 4 processor cores, or any other suitable number. In one embodiment, cache 624 is a set associative L2 cache. In some embodiments, cores 626A and/or 626B may include internal instruction and/or data caches. In some embodiments, a coherency unit (not shown) in fabric 610, cache 624, or elsewhere in device 600 may be configured to maintain coherency between various caches of device 600. BIU 622 may be configured to manage communication between processor complex 620 and other elements of device 600. Processor cores such as cores 626 may be configured to execute instructions of a particular instruction set architecture (ISA), which may include operating system instructions and user application instructions. These instructions may be stored in computer readable medium such as a memory coupled to memory controller 650 discussed below. In some embodiments, complex 620 may correspond to or include CPU 110.

Graphics unit 630 may include one or more processors and/or one or more graphics processing units (GPU's). Graphics unit 630 may receive graphics-oriented instructions, such as OPENGL®, Metal, or DIRECT3D® instructions, for example. Graphics unit 630 may execute specialized GPU instructions or perform other operations based on the received graphics-oriented instructions. Graphics unit 630 may generally be configured to process large blocks of data in parallel and may build images in a frame buffer for output to a display. Graphics unit 630 may include transform, lighting, triangle, and/or rendering engines in one or more graphics processing pipelines. Graphics unit 630 may output pixel information for display images.

Display unit 640 may be configured to read data from a frame buffer and provide a stream of pixel values for display. Display unit 640 may be configured as a display pipeline in some embodiments. Additionally, display unit 640 may be configured to blend multiple frames to produce an output frame. Further, display unit 640 may include one or more interfaces (e.g., MIPI® or embedded display port (eDP)) for coupling to a user display (e.g., a touchscreen or an external display).

Cache/memory controller 650 may be configured to manage transfer of data between fabric 610 and one or more caches and/or memories. For example, cache/memory controller 650 may be coupled to an L3 cache, which may in turn be coupled to a system memory. In other embodiments, cache/memory controller 650 may be directly coupled to a memory. In some embodiments, cache/memory controller 650 may include one or more internal caches. Memory coupled to controller 650 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 650 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions, such those of OS 122 or engine 124, executable by processor complex 620 to cause device 600 to perform functionality described herein.

I/O bridge 660 may include various elements configured to implement universal serial bus (USB) communications, security, audio, and/or low-power always-on functionality, for example. I/O bridge 660 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 660. For example, these devices may include various types of wireless communication (e.g., Wi-Fi™, Bluetooth®, cellular, global positioning system, etc.), additional storage (e.g., RAM storage, solid state storage, or disk storage), user interface devices (e.g., keyboard, microphones, speakers, etc.), etc. In some embodiments, bridge 660 may include, correspond to, or be coupled to interconnect hub 202 discussed above.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computing device, comprising:
    an accessory interface port configured to connect to an accessory device;
    a processor; and
    memory having program instructions stored therein that are executable by the processor to cause the computing device to perform operations including:
        detecting a connection of an accessory device to the accessory interface port;
        determining that the accessory device is capable of supplying power to the computing device via the accessory interface port;
        receiving power supplied from the accessory device at a first default rate prior to determining whether to disable the accessory interface port;
        in response to the detected connection, evaluating a policy defining one or more criteria for restricting unauthorized access to the accessory interface port; and
        based on the evaluating, determining whether to disable the accessory interface port to prevent communication with the connected accessory device.

2. The computing device of claim 1, further comprising:
    an interconnect coupled between the processor and the accessory interface port, wherein the interconnect includes a hub circuit configured to facilitate communication between a plurality of devices via the interconnect; and
    wherein the operations further include:
        in response to determining to disable the accessory interface port, instructing the hub circuit to prevent traffic from being conveyed from the accessory interface port.

3. The computing device of claim 2, wherein the operations further include:
    in response to determining to disable the accessory interface port, presenting, on a lock screen of the computing device, a notification instructing a user to authenticate to the computing device to enable use of the accessory device.

4. The computing device of claim 1, wherein the evaluating includes:
    determining whether a lock screen is being depicted on a display of the computing device; and
    evaluating a rule of the policy, wherein the rule identifies the lock screen being displayed as a criterion for restricting access to the accessory interface port.

5. The computing device of claim 1, wherein the evaluating includes:
    determining a time since a previous accessory device was connected to the accessory interface port, wherein one of the criteria is based on the determined time satisfying a threshold.

6. The computing device of claim 1, wherein the evaluating includes:
    accessing a stored set of accessory device identifiers that correspond to accessory devices that were previously connected to the accessory interface port, wherein one of the criteria is based on the connected accessory device having an accessory device identifier included in the stored set.

7. The computing device of claim 1, further comprising:
    a biometric sensor configured to collect biometric data from a user of the computing device; and
    a secure circuit configured to:
        perform a biometric authentication by comparing the collected biometric data with biometric data of an authorized user; and
        discontinue performing biometric authentications in response to a particular number of failed biometric authentication attempts, wherein one of the criteria is based on whether the secure circuit has discontinued performing biometric authentications.

8. The computing device of claim 1, wherein the operations further comprise:
    in response to detecting the connection, determining a supply level of a battery of the computing device;
    based on the determined supply level, charging the battery using the power received via the accessory interface port; and
    in response to the charging causing the supply level to satisfy a threshold level, initiating a bootloader to load an operating system of the computing device, wherein the operating system is executable to perform the evaluating of the policy.

9. The computing device of claim 1, wherein the operations further include:
    in response to determining to not disable the accessory interface port, communicating with the accessory device via the accessory interface port to negotiate a second rate to supply power; and receiving power supplied from the accessory device at the negotiated second rate.

10. A non-transitory computer readable medium having program instructions stored therein that are executable by a computing device to cause the computing device to perform operations comprising:

receiving an indication that an accessory device has been connected to an accessory interface of the computing device;

detecting an ability of the accessory device to provide power to the computing device;

based on the detected ability, permitting the accessory device to charge a battery of the computing device prior to determining whether to enable the accessory interface;

evaluating a set of rules defining one or more criteria restricting unauthorized access to the accessory interface by the accessory device; and based on the evaluating, determining whether to enable the accessory interface to facilitate communication with the accessory device.

11. The computer readable medium of claim 10, wherein the operations further include:

in response to determining to enable the accessory interface, initializing a network stack of an operating system of the computing device, wherein the network stack is executable to process packets communicated via the accessory interface with the accessory device.

12. The computer readable medium of claim 10, wherein operations further comprise:

in response to a charge of the battery satisfying a particular threshold, booting an operating system of the computing device, wherein the operating system is executable to perform the evaluating and the determining.

13. The computer readable medium of claim 10, further comprising:

receiving, via a network interface and from a cloud service associated with the computing device, a notification that a user has reported the computing device to the cloud service as being lost; and determining to not enable the accessory interface based on one of the set of rules indicating that the accessory interface is to be disabled in response to the notification.

14. The computer readable medium of claim 10, wherein the evaluating includes:

determining a first time value indicating a period since an accessory device was connected to the accessory interface;

determining a second time value indicating a period that a lock screen has been displayed by the computing device; and evaluating a rule to enable the accessory interface based on the first and second time values.

15. A method, comprising:

a computing device detecting an accessory device coupled to an accessory interface port of the computing device, wherein the accessory interface port is configured to facilitate communication between the accessory device and the computing device;

the computing device detecting that the accessory device is configured to supply power to the computing device;

the computing device receiving power supplied by the accessory device at a first unnegotiated rate prior to determining whether to place the accessory interface port into a restricted mode that restricts access of the accessory device to the computing device via the accessory interface port;

the computing device evaluating one or more criteria indicative that an authorized user has connected the accessory device to the accessory interface port of the computing device; and based on the evaluating, the computing device determining whether to place the accessory interface port into the restricted mode.

16. The method of claim 15, further comprising:

in response to determining to place the accessory interface port into the restricted mode, the computing device advertising a reduced set of features available to the accessory device via the accessory interface port, wherein the reduced set of features includes fewer features than a set of features available via the accessory interface port when the accessory interface port is not placed into the restricted mode.

17. The method of claim 15, further comprising:

the computing device receiving power supplied by the accessory device at a first unnegotiated rate;

in response to determining to not place the accessory interface port into the restricted mode, the computing device negotiating, via the accessory interface port, a second rate that is higher than the first unnegotiated rate; and the computing device receiving power from the accessory device at the second higher negotiated rate.

18. The method of claim 15, further comprising:

the computing device recording a first time value identifying when an accessory device was last connected to the accessory interface port;

the computing device recording a second time value identifying when display of a lock screen was initiated; and wherein the evaluating includes comparing the first time value with a first threshold specified by the one or more criteria and comparing the second time value with a second threshold specified by the one or more criteria.

19. The method of claim 18, further comprising:

the computing device recording identifiers for accessory devices that previously connected to the accessory interface port;

the computing device determining an identifier for the connected accessory device; and wherein the evaluating includes determining whether the determined identifier is one of the recorded identifiers.

* * * * *